(12) United States Patent
Zadikian et al.

(10) Patent No.: US 6,724,757 B1
(45) Date of Patent: *Apr. 20, 2004

(54) CONFIGURABLE NETWORK ROUTER

(75) Inventors: Haig Michael Zadikian, McKinney, TX (US); Ali Najib Saleh, Castaic, CA (US); John Conlon Adler, Plano, TX (US); Zareh Baghdasarian, Richardson, TX (US); Vahid Parsi, Richardson, TX (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,395

(22) Filed: Jan. 15, 1999

(51) Int. Cl.[7] .................... H04L 12/50; H04L 12/28

(52) U.S. Cl. .............. 370/388; 370/400; 370/351

(58) Field of Search .................... 370/360, 235, 370/236, 389, 351, 392, 380, 388, 386, 387, 400, 401, 419, 396, 395.21; 359/123, 119, 128, 124, 127, 137

(56) References Cited

U.S. PATENT DOCUMENTS

| | | | |
|---|---|---|---|
| 4,074,072 A | 2/1978 | Christensen et al. | 179/15 |
| 4,470,139 A | 9/1984 | Munter | 370/66 |
| 4,683,564 A | 7/1987 | Young et al. | 370/63 |
| 4,939,721 A | 7/1990 | De Bosio | 370/60 |
| 5,023,864 A | 6/1991 | Cloonan et al. | 370/1 |
| 5,168,492 A | 12/1992 | Beshai et al. | 370/60.1 |
| 5,200,746 A | 4/1993 | Yoshifuji | 340/825.8 |
| 5,307,342 A * | 4/1994 | Georigiou et al. | 370/380 |
| 5,410,600 A | 4/1995 | Toy | 380/9 |
| 5,524,154 A | 6/1996 | Bergland et al. | 385/17 |
| 5,657,449 A | 8/1997 | Osaki | 370/357 |
| 5,666,218 A | 9/1997 | Hill | 359/137 |
| 5,754,320 A | 5/1998 | Watanabe et al. | 359/117 |
| 5,771,320 A | 6/1998 | Stone | 385/16 |
| 5,777,761 A | 7/1998 | Fee | 359/110 |
| 5,784,505 A | 7/1998 | Schunk | 385/17 |
| 5,835,517 A | 11/1998 | Jayaraman et al. | 372/50 |

(List continued on next page.)

FOREIGN PATENT DOCUMENTS

| | | |
|---|---|---|
| EP | 0 752 795 A2 | 1/1997 |
| EP | 0 802 697 A2 | 10/1997 |
| WO | WO 97/04397 | 2/1997 |
| WO | WO 97/24901 | 7/1997 |
| WO | W/O 97/30529 | 8/1997 |

OTHER PUBLICATIONS

Zhang, et al., "On Fundamental Issues in IP Over WDM Multicast,"*IEEE, Computer Communications and Networks,* Sep. 1999.

(List continued on next page.)

*Primary Examiner*—Hassan Kizou
*Assistant Examiner*—Hanh Nguyen
(74) *Attorney, Agent, or Firm*—Campbell Stephenson Ascolese, LLP; Samuel G. Campbell, III

(57) ABSTRACT

A signal router, configured to receive information carried by a first signal and transmit the information on a second signal, is described. The signal router, using routing information it gathers, selects the second signal from a number of signals, with the first and the second signals differing in at least one physical characteristic. The signal router operates in a network of a number of such signal routers, and so each one of the signal routers is coupled to at least one of the other signal routers. The routing information is used to create a circuit from a first one of the signal routers to a second one of the signal routers. Once the circuit is created, the information is routed over the circuit. According to one aspect of the present invention, the signals are optical signals.

7 Claims, 14 Drawing Sheets

U.S. PATENT DOCUMENTS

| | | | | |
|---|---|---|---|---|
| 5,884,017 A | * | 3/1999 | Fee | 370/217 |
| 6,026,095 A | * | 2/2000 | Sherer et al. | 370/401 |
| 6,101,010 A | * | 8/2000 | Konishi | 359/110 |
| 6,111,673 A | * | 8/2000 | Chang et al. | 370/392 |
| 6,151,304 A | * | 11/2000 | Doshi et al. | 370/238 |
| 6,160,813 A | | 12/2000 | Banks et al. | 370/422 |
| 6,188,686 B1 | | 2/2001 | Smith | 370/388 |
| 6,262,820 B1 | * | 7/2001 | Al-Salameh | 359/119 |
| 6,266,333 B1 | | 7/2001 | Kartalopoulos | 370/395 |

OTHER PUBLICATIONS

Ali Saleh; H. Michael Zadikian; Zareh Baghdasarian; Vahid Parsi, "A Method For Routing Information Over A Network", Jan. 15, 1999; Ser. No. 09/232,397.

H. Michael Zadikian; Steven E. Plote; John C. Adler; David Parish Autry; Ali Saleh, "Method of Providing Network Services", Jan. 4, 2000, Ser. No. 09/477,498.

Ali Saleh, "A Method For Path Selection In A Network", Jan. 4, 2000, Ser. No. 09/478,235.

Ali N. Saleh and Stevan E. Plote, "A Network Addressing Scheme for Reducing Protocol Overhead In An Optical Network", Sep. 2, 1999; Ser. No. 09/389,302.

Ali N. Saleh; Douglas E. Duschatko; Lane Byron Quibodeaux, "Method and Apparatus for a Rearrangeably Non–Blocking Switching Matrix", Jan. 4, 2000; Ser. No. 09/477, 166.

Michael H. Zadikian; Ali Saleh; John C. Adler; Zareh Baghdasarian; Vahid Parsi, "Configurable Network Router", Jan. 15, 1999; Ser. No. 09/232,396.

Michael H. Zadikian; Ali Saleh; John C. Adler; Zareh Baghdasarian; Vahid Parsi, "A Resource Management Protocol For A Configurable Network Router", Jan. 4, 2000; Ser. No. 60/174,323.

Ronald Alan Russell and Michael Kevin Anthony, "A Method And Apparatus For Isolating Faults In A Switching Matrix," Jan. 4, 2000; Ser. No. 09/477,217.

Komine, et al., "A Distributed Restoration Algorithm for Multiple–Link and Node Failures of Transport Networks," *IEEE, Globecom '90*, Apr. 1990.

* cited by examiner

Matrix Rack 900

| 800(1,3) | 800(1,2) | 800(1,1) |
|---|---|---|
| 800(2,3) | 800(2,2) | 800(2,1) |
| 800(3,3) | 800(3,2) | 800(3,1) |
| 800(4,3) | 800(4,2) | 800(4,1) |
| 800(5,3) | 800(5,2) | 800(5,1) |
| 800(6,3) | 800(6,2) | 800(6,1) |
| 800(7,3) | 800(7,2) | 800(7,1) |
| 800(8,3) | 800(8,2) | 800(8,1) |
| 910(6) \| 910(5) | 910(4) \| 910(3) | 910(2) \| 910(1) |
| 800(9,3) | 800(9,2) | 800(9,1) |
| 800(10,3) | 800(10,2) | 800(10,1) |
| 800(11,3) | 800(11,2) | 800(11,1) |
| 800(12,3) | 800(12,2) | 800(12,1) |
| 800(13,3) | 800(13,2) | 800(13,1) |
| 800(14,3) | 800(14,2) | 800(14,1) |
| 800(15,3) | 800(15,2) | 800(15,1) |
| 800(16,3) | 800(16,2) | 800(16,1) |

*FIG. 9*

CONFIGURABLE NETWORK ROUTER

CROSS-REFERENCES TO RELATED APPLICATIONS

This application is related to patent application Ser. No. 09/232,395, entitled "A METHOD FOR ROUTING INFORMATION OVER A NETWORK," having A. Saleh, H. M. Zadikian, Z. Baghdasarian, and V. Parsi as inventors and filed concurrently herewith. This related application is assigned to Cisco Systems, Inc., the assignee of the present invention, and is hereby incorporated by reference in its entirety and for all purposes.

BACKGROUND OF THE INVENTION

1. Field of the Invention

This invention relates to the field of information networks, and more particularly relates to one or more routers capable of routing information over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

The synchronous optical network (SONET) protocol is among those protocols employing an optical infrastructure. SONET is a physical transmission vehicle capable of transmission speeds in the gigabit range, and is defined by a set of electrical as well as optical standards. SONET's ability to use currently-installed fiber-optic cabling, coupled with the fact that SONET significantly reduces complexity and equipment functionality requirements, gives local and interexchange carriers incentive to employ SONET. Also attractive is the immediate savings in operational cost that this reduction in complexity provides. SONET thus allows the realization of a new generation of high-bandwidth services in a more economical manner than previously existed.

SONET networks have traditionally been protected from failures by using topologies that dedicate something on the order of half the network's available bandwidth for protection, such as a ring or mesh topology. Two approaches in common use today are diverse protection and self-healing rings (SHR), both of which offer relatively fast restoration times with relatively simple control logic but do not scale well for large data networks. This is mostly due to their inefficiency in capacity allocation. Their fast restoration time, however, makes most failures transparent to the end-user, which is important in applications such as telephony and other voice communications. The existing schemes rely on 1-plus-1 and 1-for-1 topologies that carry active traffic over two separate fibers (line switched) or signals (path switched), and use a protocol (Automatic Protection Switching or APS), or hardware (diverse protection) to detect, propagate, and restore failures.

A SONET network using an SHR topology provides very fast restoration of failed links by using redundant links between the nodes of each ring. Thus, each ring actually consists of two rings, a ring supporting information transfer in a "clockwise" direction and a ring supporting information transfer in a "counter-clockwise" direction. The terms "east" and "west" are also commonly used in this regard. Each direction employs it's own set of fiber-optic cables, with traffic between nodes assigned a certain direction (either clockwise or counter clockwise). If a cable in one of these sub-rings is damaged, the SONET ring "heals" itself by changing the direction of information flow from the direction taken by the information transferred over the failed link to the sub-ring having information flow in the opposite direction.

The detection of such faults and the restoration of information flow thus occurs very quickly, on the order of 10 ms for detection and 50 ms for restoration for most ring implementations. The short restoration time is critical in supporting applications, such as current telephone networks, that are sensitive to quality of service (QoS) because it prevents old digital terminals and switches from generating red alarms and initiating Carrier Group Alarms (CGA). These alarms are undesirable because such alarms usually result in dropped calls, causing users down time aggravation. Restoration times that exceed 10 seconds can lead to timeouts at higher protocol layers, while those that exceed 1 minute lead to disastrous results for the entire network. However, the price of such quickly restored information flow is the high bandwidth requirements of such systems. By maintaining completely redundant sub-rings, an SHR topology requires 100% excess bandwidth.

An alternative to the ring topology is the mesh topology. The mesh topology is similar to the point-to-point topology used in internetworking. Each node in such a network is connected to one or more other nodes. Thus, each node is connected to the rest of the network by one or more links. In this manner, a path from a first node to a second node uses all or a portion of the capacity of the links between those two nodes.

Networks based on mesh-type restoration are inherently more capacity-efficient than ring-based designs, mainly because each network link can potentially provide protection for fiber cuts on several different links. By sharing the capacity between links, a SONET network using a mesh topology can provide redundancy for failure restoration at less than 100% of the bandwidth capacity originally required. Such networks are even more efficient when traffic transits several links. One study found that for an 11-node, 22-span network, only 51% redundant net capacity was required for 100% restorability, as reported in, "The design and simulation of an intelligent transport network with distributed control," by T. Chujo, H. Komine, K. Miyazaki, T. Ogura, and T. Soejima, presented at the Network Operations Management Symposium, San Diego, Feb. 11–14, 1990, which is incorporated herein by reference, in its entirety and for all purposes. The corresponding ring-based design required five rings and a total DS-3 redundancy of 330%. However, path restoration often consumes several minutes in such a topology. This is much slower than the restoration times exhibited by ring topologies and is so long that connections are often lost during the outage.

Various kinds of networking equipment can be used to support the ring and mesh topologies just described. Options include:

1. Back-to-back wavelength division multiplexers (WDMs) and optical cross-connects (OXCs) for use in mesh topologies.
2. Back-to-back optical add/drop multiplexers (O-ADM) for ring topologies.
3. Other combinations (e.g., WDM combined with OXC, digital cross-connect systems (DCSs), and other such equipment)

WDMs may be connected in back-to-back configurations to allow the connection of various wavelength routes to one another (also known as "patching" or "nailing up" connections). Provisioning paths in such architectures is done manually using a patch panel. Thus, provisioning is slow and prone to mistakes due to human error and equipment failure. In the event of a failure, restoration is performed manually in such architectures and is again slow and error-prone. Such architectures scale poorly because additional bandwidth is added by either adding to the number of wavelengths supported (requiring the replacement of equipment at nodes, and possibly the replacement of fiber-optic cables as well) or adding new fiber-optic cables and supporting node equipment. Such architectures are also inherently unmanageable, due to the lack of centralized control. And, while the initial capital investment tends to be relatively low (as a result of their simplicity), operating expenses for such architectures tend to be relatively high because of the costs associated with configuration, expansion, and management. Thus, a mesh topology employing back-to-back WDM's will tend to be slow to deploy and difficult to manage due to the need for manually "nailing up" paths and lack of centralization.

Another architectural element that may be used to create a mesh topology is the optical cross-connect (OXC). OXCs allow provisioning using a centralized scheme to accomplish provisioning in a matter of minutes. Restoration in the event of a failure may be performed manually or may be effected using a centralized management system. However, restoration still requires on the order of minutes per wavelength route restored. As with the back-to-back WDM architecture, a mesh topology that employs OXCs scales poorly. This is due in part to the exponential increase in the physical size experienced when expanding the capacity of an OXC with the addition of input and output links. For example, an OXC that supports two links (fiber-optic cables), each having three paths, will need to provide a switching fabric that supports the six possible combinations of connections between the paths carried by the two fiber-optic cables. When this number is increased to four paths per fiber-optic cable, the number of possible connections increases to twenty-four. As still more paths are added to each link and more links are supported, the possible number of connections increases dramatically, increasing the physical size of the affected OXC.

An OXC can be either transparent (i.e., purely optical, in which the signals are never converted to electrical signals) or opaque (i.e., the optical signals are converted into electrical signals and then converted back into optical signals). Transparent optical cross-connects provide little in the way of manageability because the information carried by lightwave is never made accessible to the OXC's operator. In contrast, opaque OXCs can be configured to permit access to the information being switched. However, neither type of OXC maintains information regarding the topology of the network and, in fact, OXCs possess no intrinsic network intelligence. Moreover, OXC technology is expensive, making initial investment quite high, as well as the cost of future expansion.

Alternatively, a SONET network may be configured in a ring (SHR) topology by using add/drop multiplexers (ADMs). An ADM is a SONET multiplexer that allows DS1 signals to be added into or dropped from an STS-N signal. ADMs have two bidirectional ports, commonly referred to as an east and a west port. Using ADMs, a SONET network in a SHR topology uses a collection of nodes equipped with ADMs in a physical closed loop such that each node is connected to two adjacent nodes with a duplex connection. Any loss of connection due to a single failure of a node or a connection between nodes is automatically restored. The traffic terminated at a failed node, however, is lost. Two types of SHRs are unidirectional (USHR) and bidirectional (BSHR), as defined by the traffic flow in normal conditions. Bidirectional rings have a capacity carrying advantage over unidirectional rings because of the ability to share protection capacity among the links between nodes, as opposed to unidirectional rings, which dedicate capacity all the way around the ring.

Provisioning in such architectures is centralized and can be performed in minutes. While restoration can also be performed quickly (on the order of 50 ms, as previously noted), 100% spare bandwidth is required. Thus, the user must install fiber-optic cabling for two networks, one for normal traffic and one to be used in the event of a failure. Moreover, the cabling for each link should be physically located as far from its corresponding link in order to minimize the possibility that a cause of physical damage will damage both links and cause both directions of a ring to fail. These issues detrimentally affect cost, manageability, and scalability. With regard to expansion, ADMs are stacked in an SHR in order to increase capacity. However, stacked ADMs are blocking. In other words, the switching function may not allow the transfer of data from a port on one stacked ring to a portion on another ring. Thus, an architecture employing ADMs is best suited for small offices or other situations that do not require the relatively large amounts of bandwidth (implying the need for stacked ADMs). As noted, stacked ADMs are also difficult to manage and expensive due to the extra hardware required for 100% spare capacity.

Other combinations can also be employed. For example, WDMs can be combined with OXCs (either transparent or opaque) in order to create a network having a mesh topology. Such an architecture supports the cross-connection of wavelength routes by either manual connection or under centralized control. However, such an architecture is also difficult to expand due to the need to add WDMs/fiber-optic cables and the increase in size of the OXC, and cannot restore failed links quickly enough to avoid dropping or interrupting telecommunications connections.

Another option is the use of a digital cross-connect system (DCS). A DCS is used to terminate digital signals and cross-connect them, integrating multiple functionalities such as signal adding and dropping, cross-connection capabilities, and multiplexing and demultiplexing of signals. DCS based networks enjoy an advantage over networks employing back-to-back WDMs because the use of DCS eliminates the need for additional back-to-back electrical multiplexing, thus reducing the need for labor-intensive jumpers. Operational cost savings are realized by a DCS through electronically controlling cross-connections, test access and loopbacks, and maintenance. Two types of DCSs are wideband DCSs and broadband DCSs. Wideband DCS (W-DCS) terminates full duplex OC-Ns and DS3s, has VT cross-connection capability, and provides DS1 interfaces. A broadband DCS (B-DCS) terminates full-duplex OC-N signals and provides, for example, STS-1 and DS3 interfaces. The B-DCS makes two-way cross-connection at the DS3, STS-1, and concatenated STS-Nc levels. STS-Nc may be used, for example, in broadband services such as high definition television (HDTV), where an STS-3c cross-connection may be used to cross-connect the signal as a single, high-capacity channel.

Various attempts have been made to use DCSs in a mesh configuration to create a fault-tolerant network, but none have been successful in reducing restoration times below a few seconds. Some of these configurations rely on a central database and a central controller (usually an Operations System or OS) to restore failures.

Although these schemes often exhibit restoration times exceeding 10 minutes, such restoration times are an improvement over manual restoration, which requires hours, or even days to effect restoration. However, these results are not enough to meet the 50–200 ms restoration time required by existing telecommunication network equipment. Other implementations employ distributed architectures in which control is shared among multiple network nodes. This results in faster restoration times (on the order of about 2–10 seconds), but still does not address the need for restoration times below 200 ms.

SUMMARY OF THE INVENTION

One embodiment of the present invention overcomes conventional limitations by including a network element that supports relatively simple provisioning and relatively fast restoration (on the order of, for example, 50 ms), while providing relatively efficient bandwidth usage (i.e., minimizing excess bandwidth requirements for restoration, on the order of less than 100% redundant capacity and preferably less than 50% redundant capacity). Such a network element is, in one embodiment, based on an architecture that can be easily scaled to accommodate increasing bandwidth requirements.

One embodiment allows a network of nodes, each capable of routing information from one carrier signal to another, to be configured to support the routing of information across the network using those signals to form a circuit. The carrier signals (e.g., optica signals) differ from one another in at least one physical characteristic (e.g., wavelength). The carrier signals, and so the circuit thus selected can be based on routing information obtained from a user, generated by one or more of the nodes, or assembled from other sources. A network element capable of performing such routing functions supports simple provisioning and fast restoration (for example, on the order of 50 ms), while providing efficient bandwidth usage, and can easily scale to accommodate increasing bandwidth requirements.

According to another embodiment of the present invention, a signal router is configured to receive information carried by a first signal and transmit the information on a second signal. The signal router, using routing information, selects the second signal from a number of signals, with the first and the second signals differing in at least one physical characteristic. The signal router operates in a network of a number of such signal routers, and so each one of the signal routers is coupled to at least one of the other signal routers. The routing information is used to create a circuit from a first one of the signal routers to a second one of the signal routers. Once the circuit is created, the information is routed over the circuit. According to one aspect of the present invention, the signals are optical signals.

According to yet another embodiment of the present invention, a signal router is capable of routing information on different wavelengths. The signal router includes an optical receiver, configured to receive light of a first wavelength. The light of the first wavelength carries the information being routed. The signal router further includes an optical transmitter configured to transmit light of a second wavelength. The optical receiver and the optical transmitter are coupled to a switching matrix. The switching matrix is configured to perform several actions. These actions include selecting the optical transmitter from a number of such optical transmitters, based on routing information obtained by the signal router, and transferring the information from the optical receiver to the selected optical transmitter.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 9 illustrates an example of a physical configuration used for holding one or more matrix stages.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

Figure 1A:
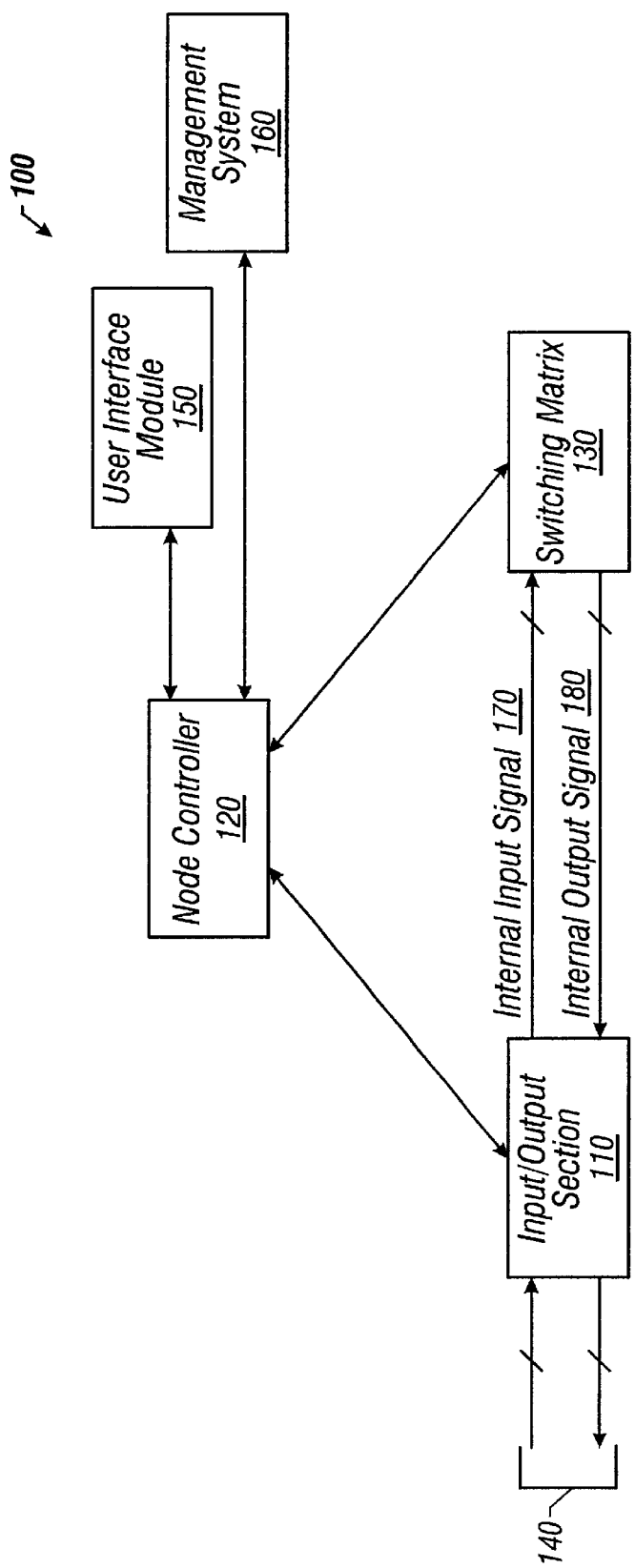
FIG. 1A is a block diagram of an exemplary router.
Figure 1B:
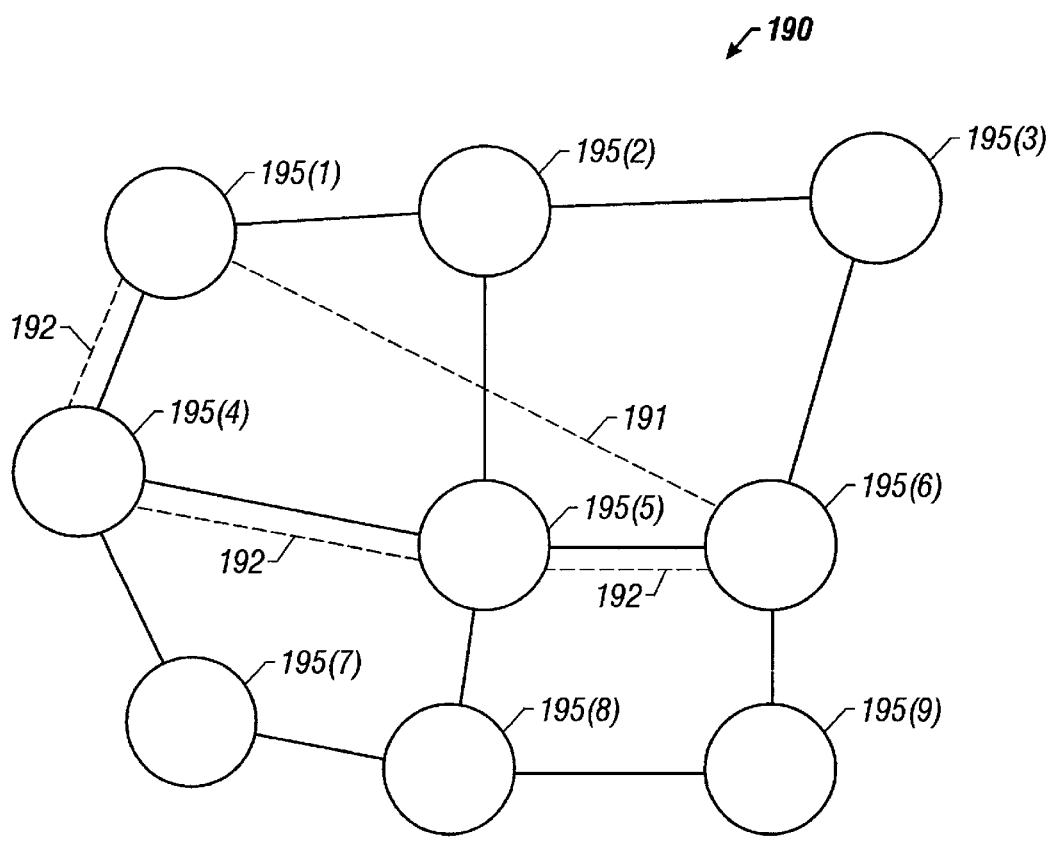
FIG. 1B is a block diagram of a network including a number of the routers of FIG. 1A.

FIG. 1A illustrates a router 100. Router 100 includes an input/output section 110, a node controller 120, and a switching matrix 130. Node controller 120 contains, for example, real time software and intelligent routing protocols (not shown). Router wavelength 100 supports interfaces including, but not limited to, optical signal interfaces (e.g., SONET), a user interface module 150, and a management system 160. Internal input signals 170 and internal output signals 180 may be electrical or optical in nature. FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

Among other benefits, router 100 solves three growth-related problems often enountered in today's information networks, and particularly in SONET networks:

1. Port Capacity growth: Router 100 includes, for example, a scaleable architecture which can provide, for example, (i) 250 or more nodes/network and (ii) at least 4096 ports/node, at a relatively low cost and high density.
2. Bandwidth management: The distributed management architecture of one embodiment of exemplary router 100 allows some or all nodes in the network to be managed from a single workstation. Provisioning a new connection is easily accomplished. Provisioning may be effected, for example, by selecting the source and destination nodes and specifying the required bandwidth and desired quality of service (QoS). An QoS-based shortest-path first (SPF) path section method is invoked to calculate the best route for the new connection. The QoS-based technique can take into consideration parameters such as existing trunk allocations, network status, the priority and desired quality of the new connection, and other such criteria. This can be accomplished, for example, by sending one or more configuration requests to, and awaiting acknowledgment replies from, the nodes along the new connection's path.
3. Efficient and fast restoration: An exemplary network of two or more routers 100 as illustrated in FIG. 1B preferably uses a mesh topology. Through the use of the routers 100, the network can be more efficient than existing ring topologies, especially when connections span multiple rings. This is possible because a single spare connection in a mesh network can provide protection for several different possible span cusps. In a ring-based network, however, spares can typically only protect against failures on their own ring. Furthermore, when connections span multiple rings, "dedicated" spare bandwidth must typically be allocated on every ring along the path. No other connections can share this spare bandwidth. Recent studies have found that mesh restoration typically requires only about 51% redundancy to yield 100% restorability, while a corresponding ring-based design typically require 330% redundancy for 100% restorability. One emobodiment of router 100 supports the restoration of a majority of network failures within less than 50 ms, thus eliminating an advantage that rings generally have over mesh topologies: fast restoration time. A protocol, such as that according to the co-pending application entitled "A METHOD FOR ROUTING INFORMATION OVER A NETWORK" (as previously referenced), can be run on such a router and encompasses all aspects of the restoration process: alarm gathering, path implementation (including alternate path discovery), and path assurance. In cases where there is insufficient bandwidth to satisfy all failed connections, the protocol, in one embodiment, can use a quality of service (QoS) metric to prioritize the restoration sequence. In such embodiment, connections with the highest QoS are restored first, followed, in a descending order, by those with a lower QoS, until either all connections have been restored or all available bandwidth has been used.

Router 100 is a multi-rack, fully redundant router that, in one embodiment, supports at least 256, 1+1 I/O ports, and provides 1-plus-1 protection by using multiple copies (e.g., two or more) of group and main matrices operating in 1+1 mode. Failures within one copy of a given matrix do not require a complete switchover to the backup copy. Only the affected paths through the matrix are switched to the backup copy. This greatly improves switching speed and minimizes the impact of such redundancy on other connections. Preferably, the group matrix is a 2:1 reduction stage that selects output signals from one of two line cards or I/O modules and connects the selected output signals to the main matrix, thus preventing non-working antecedent from consuming any ports on the main matrix.

In one embodiment, there are at least three types of processors in a router 100. The lowest level, level-3, resides on the line card, also referred to herein as an I/O module, and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 is a multi-rack communications system capable of terminating at least 8192 signals and cross-connecting at least 4096 OC-48 signals. Such a router can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N).

Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
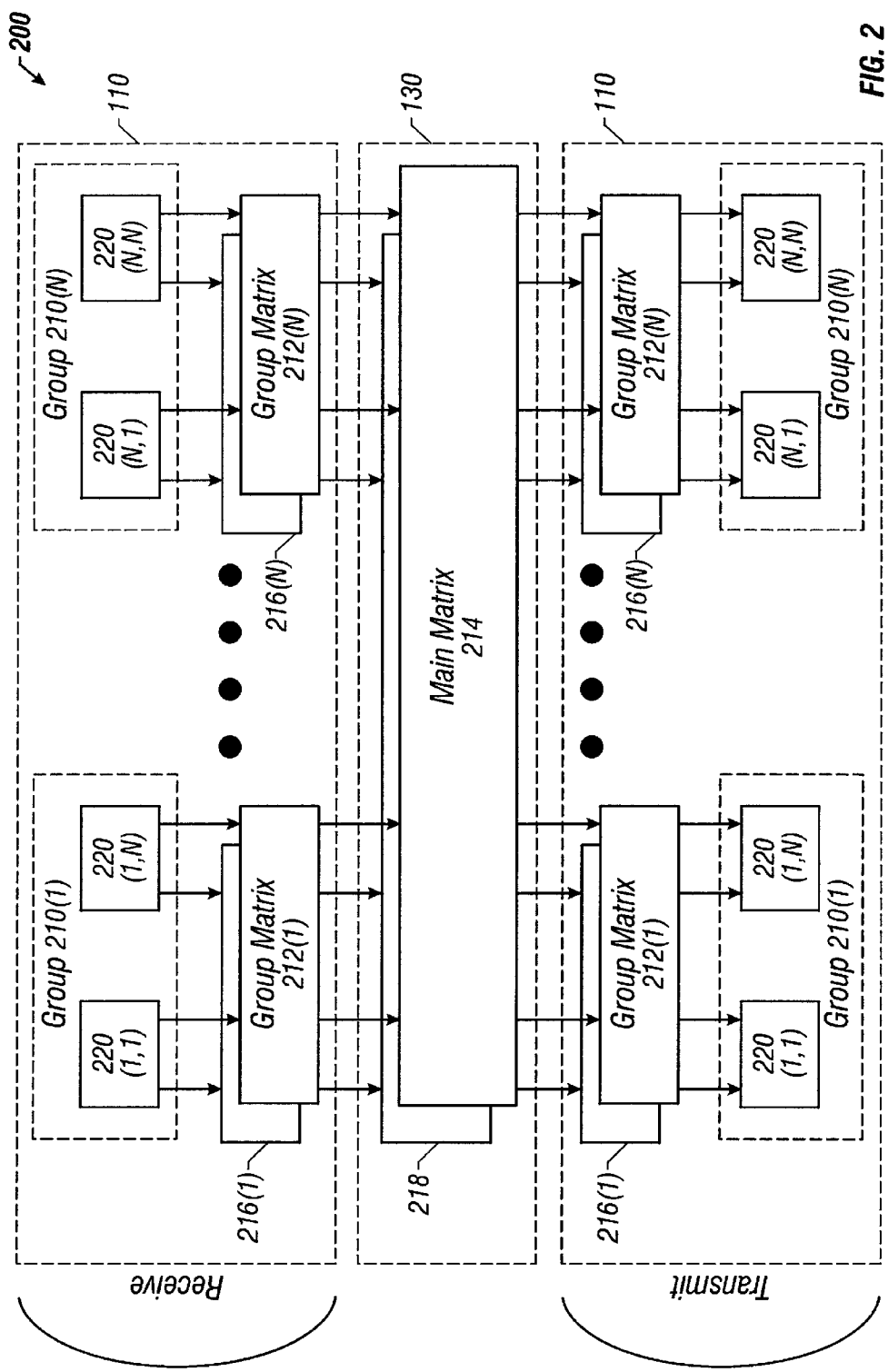
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1, 1)–(N,N) are sent to the corresponding group matrix. In one embodiment, two sets of the group matrix cards, group matrices 212(1)–(N) and group matrices 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e. group matrices 216(1)–(N)), is also provided on the transmit side.

NOTE: The variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, reartangeably non-blocking switching network. In one embodiment, switching matrix 130 is a 256×256 switching network that consists of three columns and 16 rows of 16×16 switching elements that allow any of their inputs to be connected to any of their outputs. Also, preferably a single copy of the matrix is housed in a single rack that contains three shelves, one for each column (or stage) of the matrix. Each shelf contains cards housing the 16 switching elements in each stage. The switching element itself may include, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors using, for example, a redundant Ethernet connection.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits it into two signals. One of the signals is sent to an active line card, while the other, when available, is sent to a backup card.

Line cards 220(1,1)–(N,N) receive optical signals from group matrices 212(1)–(N) and 216(1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)– (N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network (SONET) Transport Systems,* Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
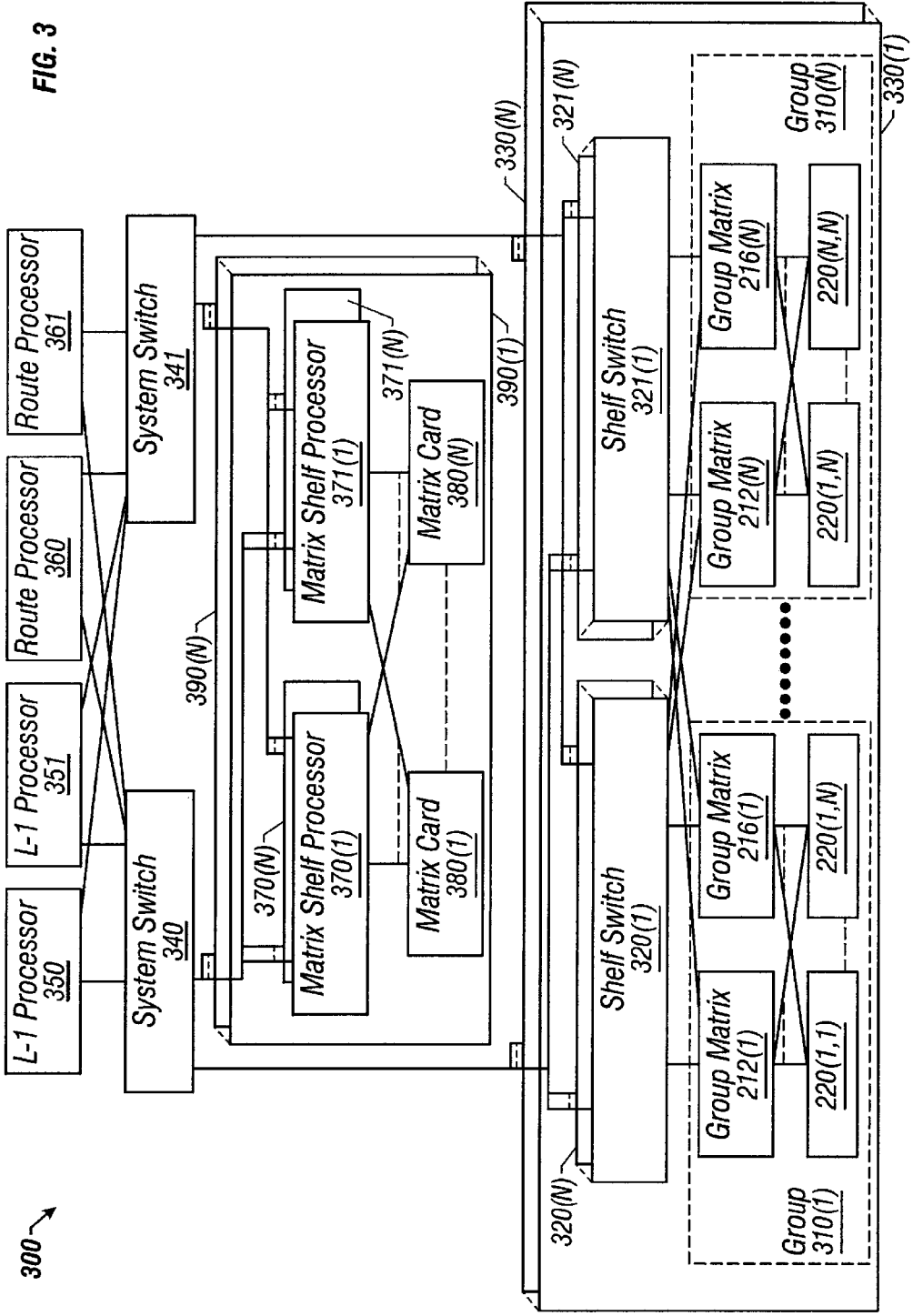
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1,1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrix 212(1) and group matrix 216(1). Group matrices 212(1)–(N) and 216(1)–(N) each feed a signal into shelf switches 320(1)–(N) and 321(1)–(N) of FIG. 2. Shelf switches 320(1)–(N) and 321(1)–(N) are each controlled by a shelf processor (not shown), for the sake of clarity and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320(1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch (in routers using Ethernet-based inter-processor communications, this is referred to as the system Ethernet switch), of which there are two copies in each router. These are shown as system switches 340 and 341 in FIG. 3. This fully redundant scheme prevents failures on one shelf switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N).

It will be noted that main matrix 214 includes matrix cards 380(1,1)–(1,N), and that, more generally, main matrices 214 and 218 are included matrix racks 390(1)–(N)

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus. If more inter-processor communication bandwidth is required, then the connection is preferably a higher speed connection, such as that provided by a gigabit Ethernet or fiber-channel connection.

Physical Configurations and Modules

I/O Bay

Figure 4:
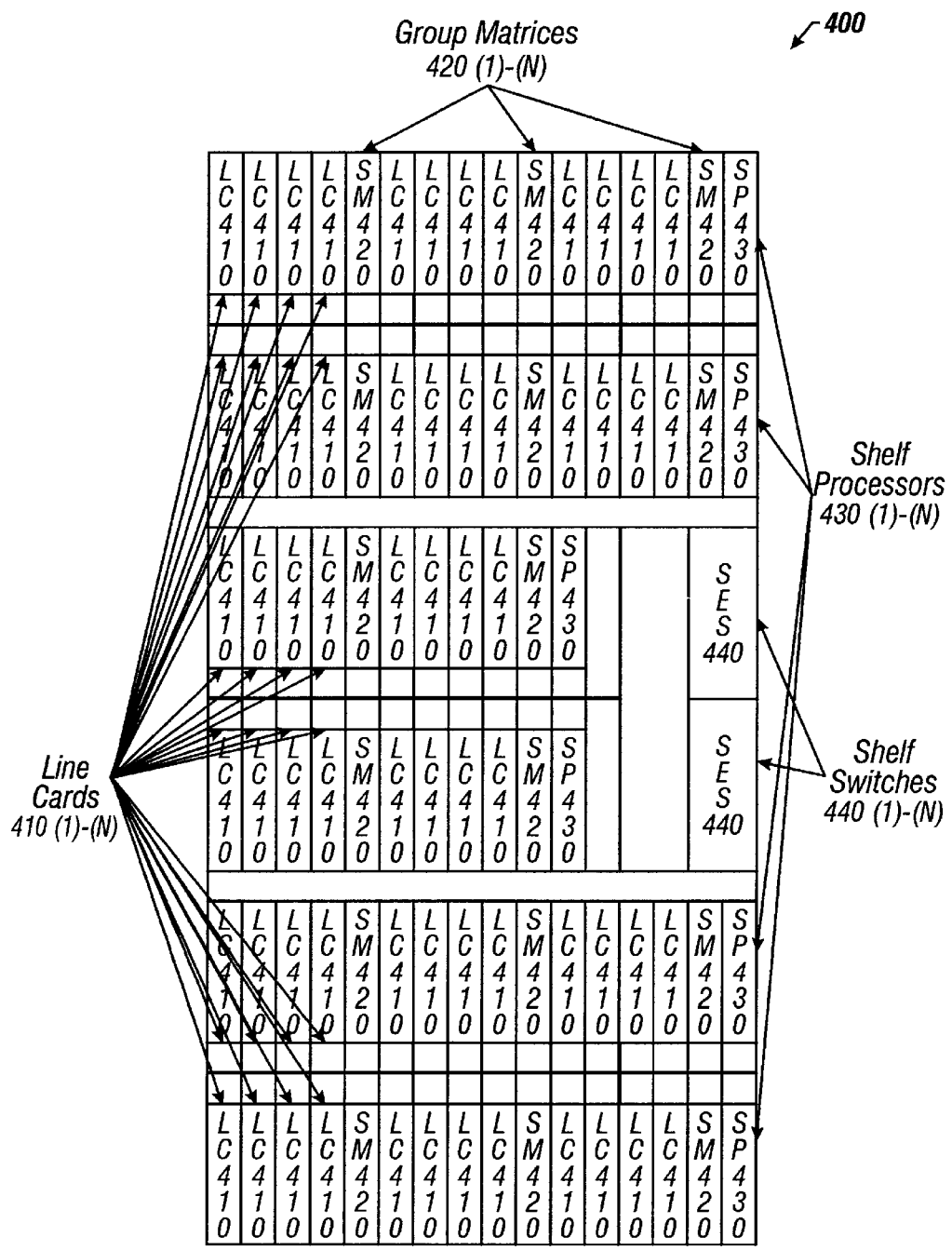
FIG. 4 illustrates an exemplary layout of an input/output (I/O) bay.

FIG. 4 illustrates an exemplary layout of an input/output (I/O) bay 400. The I/O bay shelf can support, for example, a total of 16 slots. Slots may be logically divided into functional groups. In such an embodiment, four such functional groups are defined with three of the groups occupying five slots each. In that embodiment, the other group, which occupies a single slot can be configured to house the shelf processor. Thus, in the embodiment shown in FIG. 4, I/O bay 400 contains line cards (LC) 410(1)–(N), group matrices (GM) 420(1)–(N), which are controlled by shelf processors (SP) 430(1)–(N), which are exemplary of line cards 220 (1,1)–(N-N), group matrices 212 (1)–(N) and 216 (1)(N), and self processors 320 (1)–(N) and 321(1)–(N), and shelf switches 440(1)–(N). It will be noted that the various line cards, group matrices, and shelf processors correspond to similar elements from previous figures.

Groups and Magazines

A group is made up of line cards occupying a number of slots on a shelf. A slot is also referred to herein as a magazine In one implementation, the group is 20 line cards that occupy five slots. Four of the slots hold, for example, 16 line cards at 4 per slot. The same slot can be used with a wide variety I/O module and in various configurations. One example of this flexibility, in a SONET configuration, is the ability to house an OC-192 I/O modules in the same space occupied by four OC-48 line cards. In fact, the slots in each group are not required to be of the same type or structure. This architecture provides felxibility to allow any combination of line cards to be installed in each slot.

The fifth slot in the aforementioned embodiment can be configured to accept line cards containing an optical switching matrix and a hub (e.g., an Ethernet hub). Preferably, two group matrix cards are employed, each containing a 2:1 optical reduction stage that "selects" working channels before the signals leave the shelf. In a 1+1 protection scheme, the two inputs to the line cards are classified as active and protect channels. The working channel is one of the active and protect channels that is selected based on bit error rate or other criteria, and so implements a redundancy scheme. This prevents the standby line cards from using any bandwidth on switching matrix 130.

Backplane

The following describes one embodiment of a backplane and some of the interface signals on that backplane. The backplane in the I/O bay shelf carries a variety of signals between line cards and other modules in the shelf. Each I/O shelf module is configured to allow an automatic, errorless switch from one power bus to the other. Backplane signals that are common to all modules in the I/O shelf includes power, ground, and signal ground.

Shelf processor module backplane signals include reset signals, clock signals, hardware detect signals (e.g., card detect, copy present, and the like), slot ID signals, and slot communication signals (both low and high speed). I/O module (line card) backplane signals include reset signals, clock signals, communication signals, hardware detect signals, and slot ID signals. Group matrix module backplane signals include reset, clock signals, communication signals (both low and high speed), detection and hardware detect signals, and slot ID signals.

System Modules

Line Card

Figure 5:
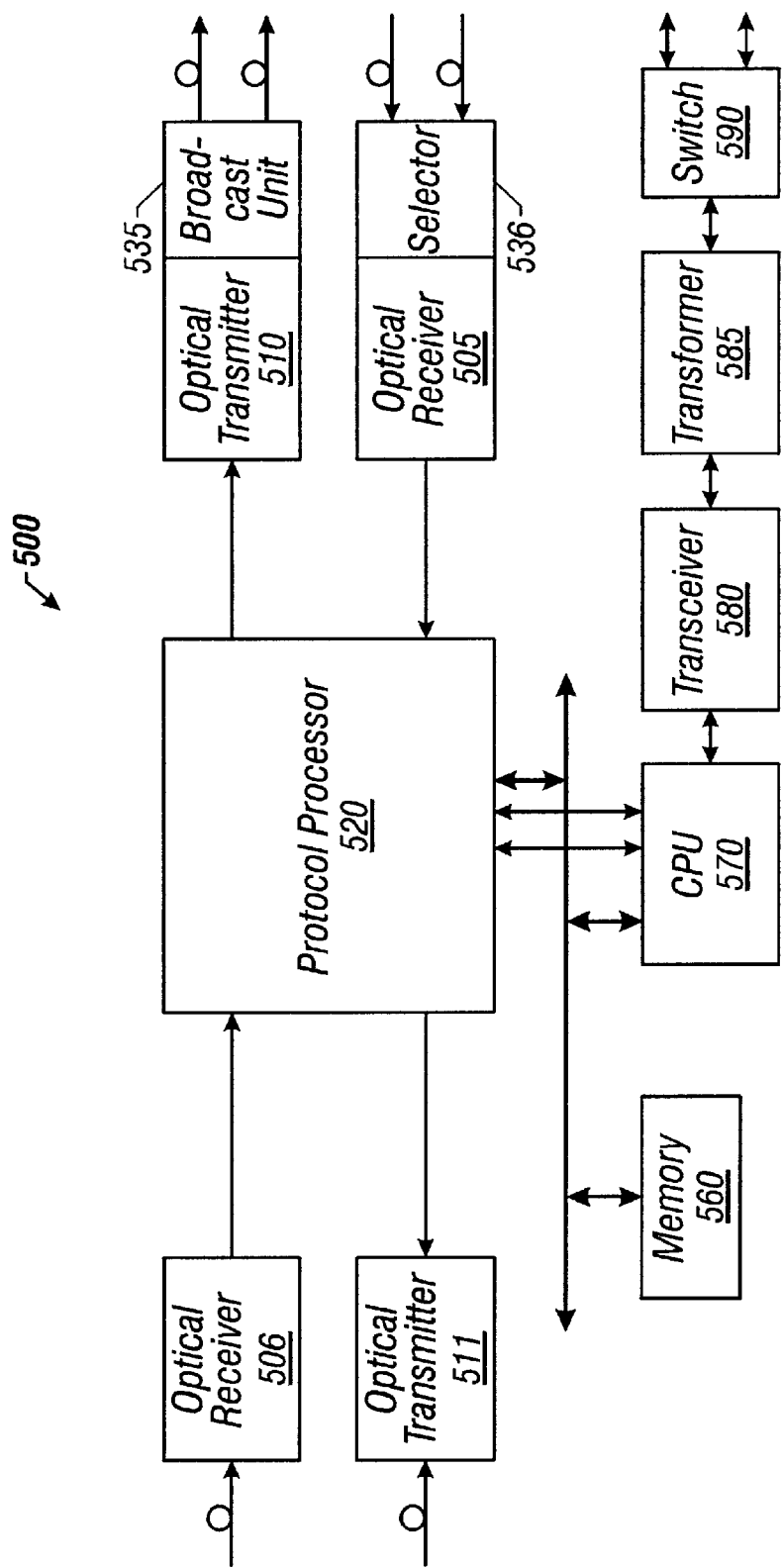
FIG. 5 illustrates the major components of one of the line cards.

FIG. 5 illustrates the major components of one of line cards 220(1,1)–(N,N), exemplified in FIG. 5 by a line card 500. A line card, also referred to herein as an I/O module, integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 500 receives optical signals from other network elements via a line-side optical receiver 505 and from the local router's system via a system-side optical receiver 506. Each of these receivers implements an optical-to-electrical (O/E) conversion function. Line card 500 transmits optical signals to other network elements using a line-side optical transmitter 510 and to the group matrices using a system-side optical transmitter 511. Each of these transmitters implements an electrical-to-optical (O/E) conversion function. It will be noted that line-side refers to the side of the line card coupled to other network elements and system-side refers to the side of the line card coupled to the group matrices.

Line-side optical receiver 505 is coupled to a protocol processor 520 which performs clock recovery multiplexing, demultiplexing, and SONET STE/LTE processing in both directions. Similarity, system-side optical receiver 506 is also coupled to protocol processor 520 to allow protocol processor 520 to receive optical signals. The processed electrical signals from protocol processor 520 are coupled to the transmitters 510 and 511. The clock recovery functions are combined with demultiplexers and multiplexers to support reception and transmission of the optical data, respectively. The multiplexers serialize output data generated in protocol processor 520 by performing parallel-to-serial conversion on the parallel data. In contrast, de-multiplexers are used in protocol processor 520 to perform serial-to-parallel conversion on received data.

In order to add protection channels, line-side optical transmitter 510 is also coupled to a 1:2 broadcast unit 535. To receive such optical signals, optical receiver 506 is also coupled to a 2:1 selector 536 in order to select the working channel before the optical signals leave the shelf and thus prevent the standby channel (also referred to herein as the protect channel) from using any bandwidth on switching matrix 130.

Protocol processor 520 is coupled to a bus 545. Protocol processor 520 interfaces line card 500 to two copies of the matrix in a 1+1, physical protocol. In a SONET implementation, protocol processor 520 provides both STE/LTE processing according to published industry standards. Also coupled to bus 545 are a memory 560 and a CPU 570. Memory 560 should be fast enough for efficient operation of CPU 570.

CPU 570 communicates with other of line cards 220(1,1)–(N,N) over a control bus (not shown) using a transceiver 580 that is coupled to CPU 570. Transceiver 580, is coupled to a transformer 585 which is coupled to a switch 590. Switch 590 is coupled to the control bus. Switch 590 implements a 1:1 protection scheme for transceiver 580 and couples CPU 570 to two independent ports on the backplane (not shown). Each of the two ports connects to one copy of the hub of the group matrix. This allows the software on the line card to switch to the backup link when it detects failures on the active link.

Preferably, CPU 570 includes numerous integrated peripherals including embedded SCC channels (e.g. M-band communications) and an Ethernet controller (for example, to support communications with other system module). In one embodiment, CPU 570 provides an onboard communications processor module (not shown) that handles time-critical aspects of the protocols supported.

Group Matrix Module

The group matrix module includes two independent blocks: a group matrix and a hub (also referred to herein as a repeater).

Group Matrix

Figure 6:
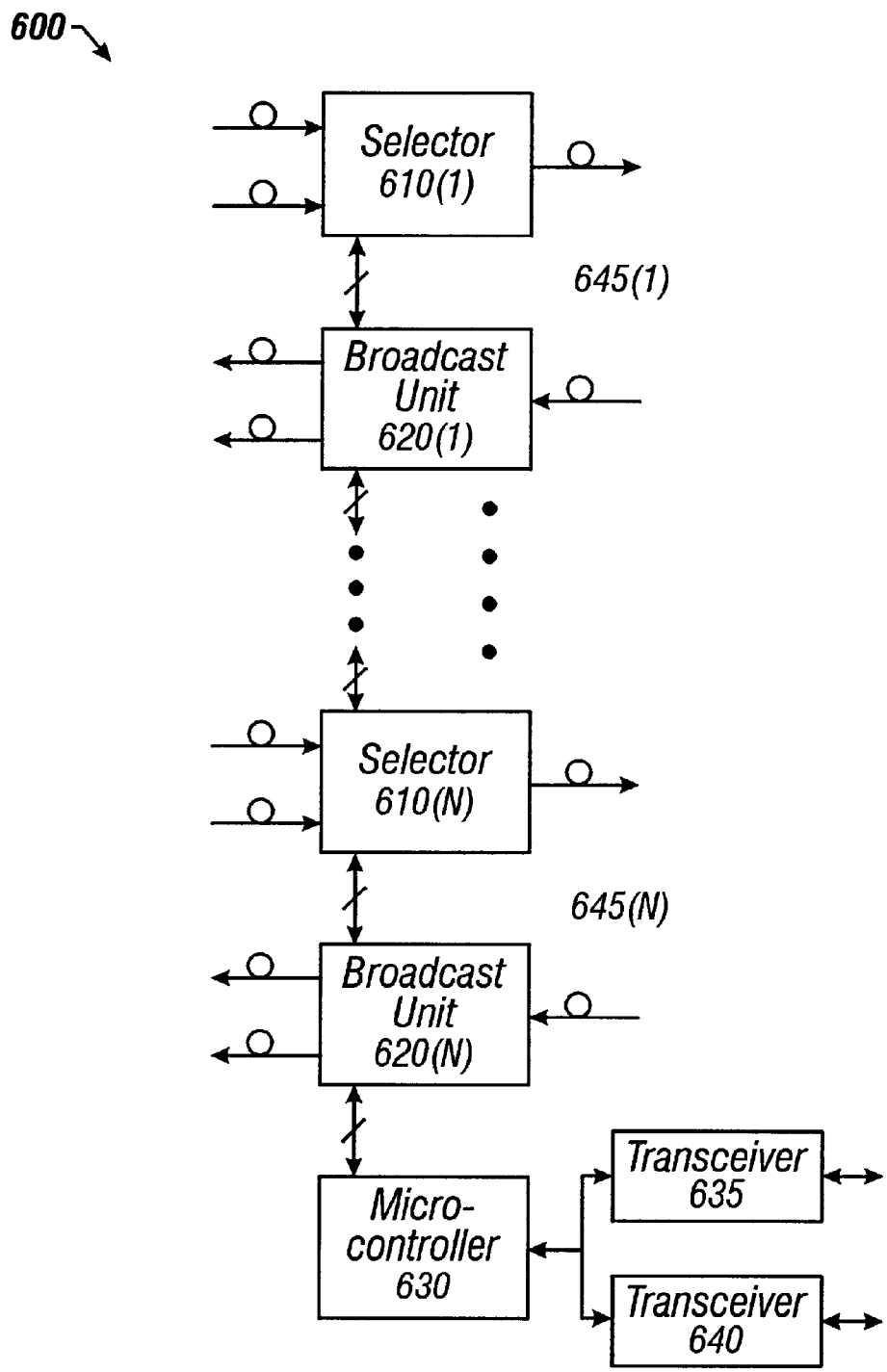
FIG. 6 illustrates an exemplary group matrix.

FIG. 6, illustrates an exemplary group matrix 600, which is exemplary of group matrices 212(1)–(N) and group matrices 216(1)–(N). In the embodiment shown in FIG. 6, group matrix 600 includes a series of 2:1 path selectors (exemplified by selectors 610(1)–(N)), broadcast units 620(1)–(N) and a microcontroller 630 controlling these. Selectors 610(1)–(N) select one of two full-duplex optical signals and couple the selected signal to switching matrix 130. Selectors 610(1)–(N) and broadcast units 620(1)–(N) are grouped into pairs to form I/O channels 645(1)–(N). Microcontroller 630 communicates with other elements of router 100 via redundant transceivers (exemplified by transceivers 635 and 640). For example, microcontroller 630 can control selectors 610(1)–(N) and broadcast units 620(1)–(N) through commands received from the group processor.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

The shelf processor module provides, among other elements, a shelf processor and switch that interconnect the LAN segments from the groups and the shelf processor to a port on the shelf switch (Ethernet switch 730).

Shelf Processor

Figure 7:
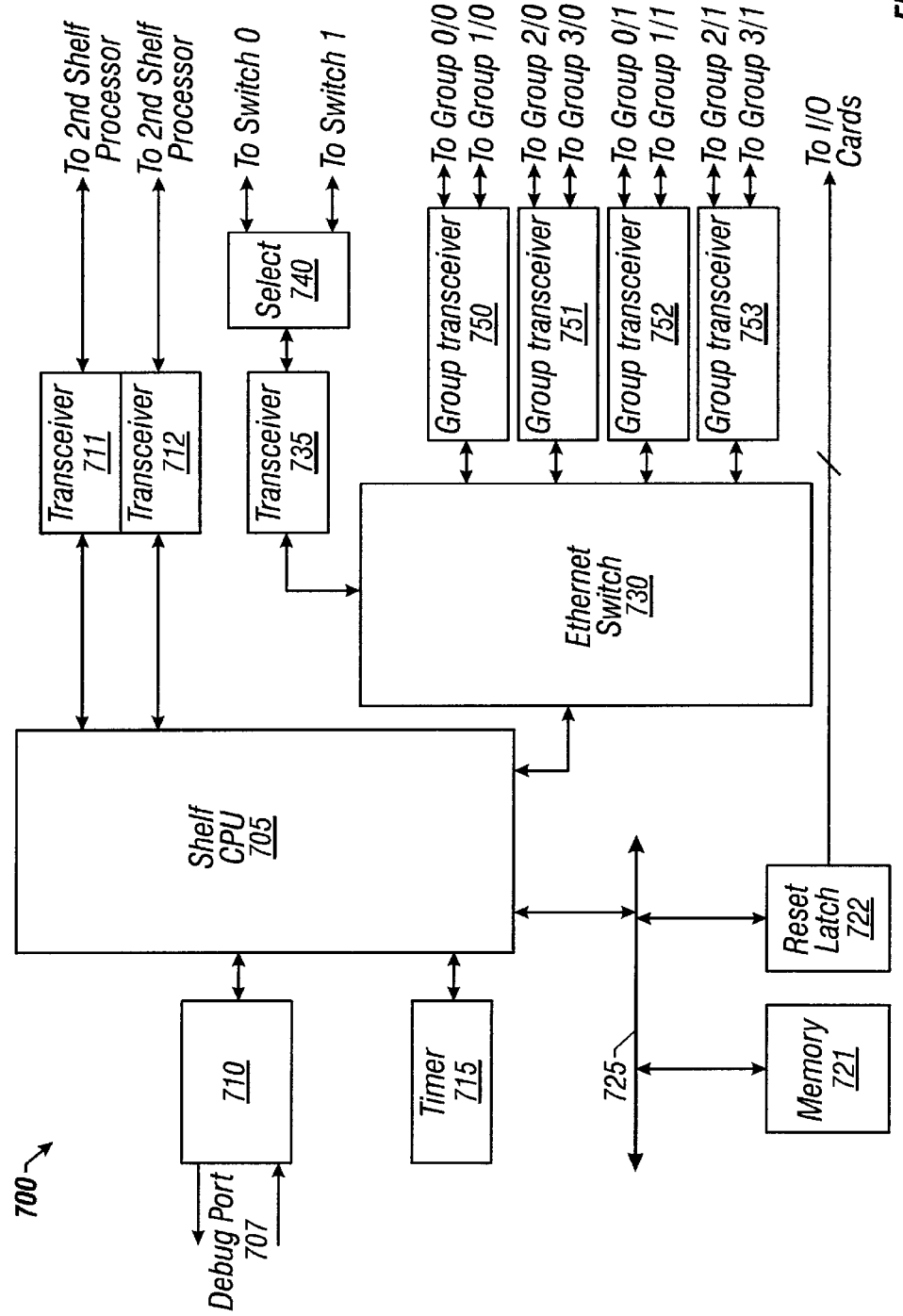
FIG. 7 illustrates a shelf processor which is responsible for the overall operation, management and control of a shelf.

FIG. 7 illustrates a shelf processor 700 which is responsible for the overall operation, management, and control of the shelf. A shelf CPU 705 controls the functions of shelf processor 700. Shelf CPU 705 is connected to a debug port 707 via a debug port transceiver 710. Debug port 707 may be a device capable of coupling shelf CPU 705 to a personal computer or dumb terminal. Debug port 707 allows a user to access shelf processor module 700 to determine the cause of any errors therein. Transceivers 711 and 712 each connect an SCC channel of shelf CPU 705 to the other shelf processor. The resulting link, which can use high-speed asynchronous framing, serves as an inter-processor communications interface.

Shelf CPU 705 is also connected to a timer 715, which preferably contains the following three functional blocks:

1. Power-fail-reset: Monitors the supply voltage and restarts the processor when power failures occur and generates a power-up reset pulse.
2. External reset: Provides a push-button interface that debounces the input signal and provides a reset pulse.
3. Timer: An internal timer that generates a reset pulse if the strobe input signal is not toggled prior to timeout (e.g., 150 ms, 600 ms, or 1.2 seconds).

Shelf CPU 705 also accesses a memory 721 and a reset latch 722 over a CPU bus 725. Reset latch 722 supports reset of one or more line (not shown). Shelf CPU 705 is also coupled to an Ethernet switch 730. The network switch interconnects the lower speed inter-processor communication network segments in each shelf. In one embodiment, the network switch provides support for 10 Mbps and 100 Mbps segments. In one embodiment, an integrated bus master and slave interface allow multiple devices to be interconnected.

Ethernet switch 730 is coupled to a transceiver 735 which, via a select 740, allows Ethernet switch 730 to connect to two separate Ethernet segments. Select 740 implements a 1:1 protection scheme that allows shelf processor 700 to recover from failures on the active segment by simply switching to the other segment. Ethernet switch 730 is also coupled to one or more group transceivers (exemplified by group transceivers 750, 751, 752, and 753). Group transceivers 750, 751, 752, and 753 connect ports on Ethernet switch 730 to the groups.

System Switch

One embodiment of a system switch (or system Ethernet switch, in routers that communicate using Ethernet) capable of interconnecting at least 13 network segments in a switched configuration. In an Ethernet-based system, the system switch supports both 10 Mbps and 100 Mbps connections. The segments come from the shelf switching in the I/O shelf and the matrix switches, among others, the system switch and allows these elements to communicate.

Main Matrix Bay

A switching matrix in router 100 is based on a rearrangeable non-blocking network. A switching matrix, as described herein, consists of switch nodes arranged in a staged array. For a 256×256 switching matrix, for example, switch matrix 130 consists of 48 nodes arranged in an array of 16 rows by 3 columns, with each column containing one stage of the switch matrix. All 48 nodes in the switch matrix are substantially similar and consist of a 16×16 crossbar device that allows any of its 16 inputs to be connected to any of its 16 outputs, regardless of the current state of the crossbar.

Main Matrix

Figure 8:
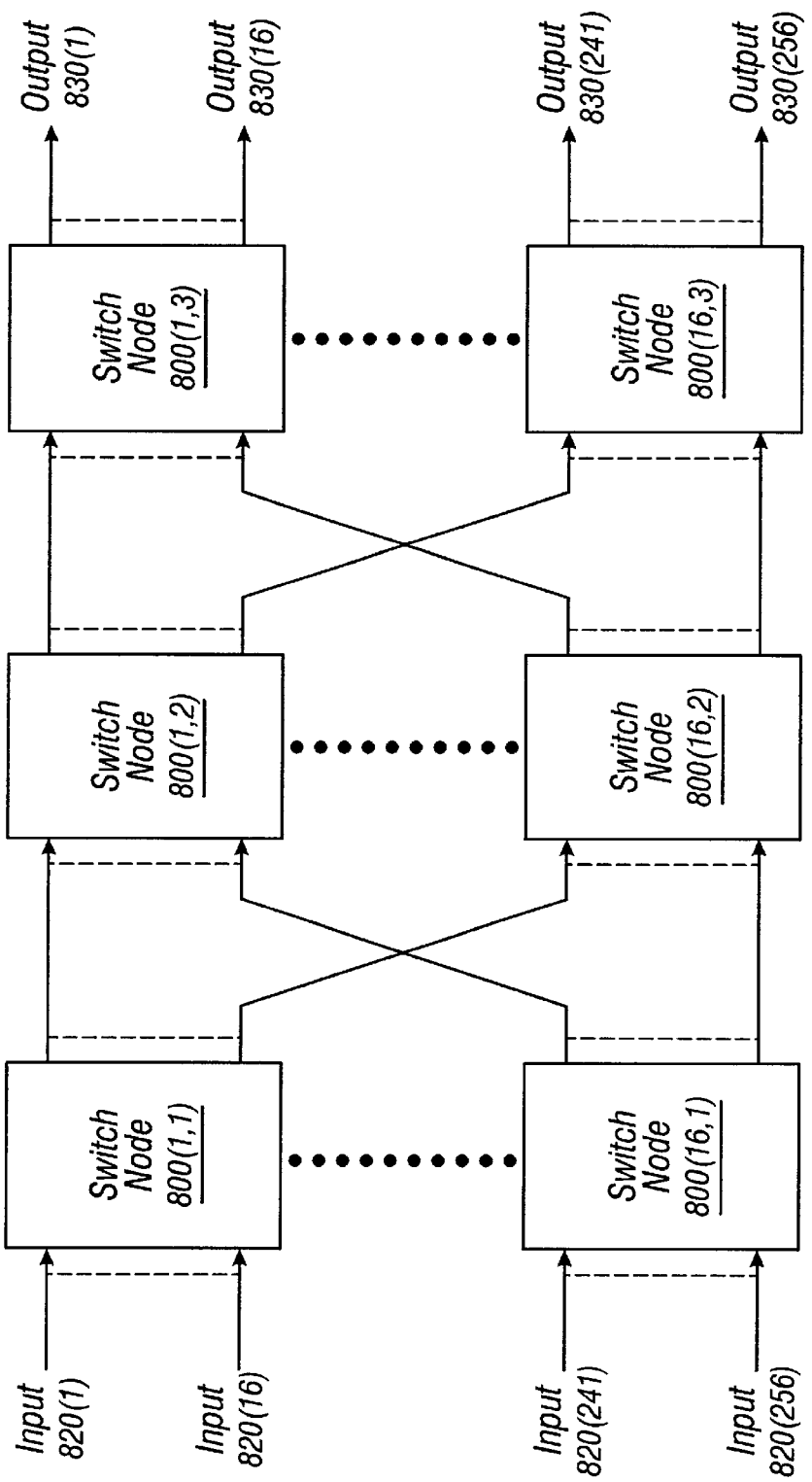
FIG. 8 illustrates the structure of a multistage matrix.

FIG. 8 illustrates switching matrix 130 configured in the manner of the switch matrix just described. In one embodiment, switching matrix 130 employs a 256×256 matrix, an array of switching nodes 800(1,1)–(16,3), each of which is a 16×16 crossbar switch that allows any of the 16 input signals to be connected to any of its 16 outputs, regardless of the current state of the crossbar. In one environment, each of the interconnections between switching nodes 800(1,1)–(16,3) represent dual gigabit interconnections. As noted, the embodiment illustrated in FIG. 8 supports the switching of up to 256 inputs, shown as inputs 820(1)–(256). Inputs 820(1)–(256) are switched to one of outputs 830(1)–(256). Physically, each of the 48 switching nodes of this embodiment occupies a single slot in the matrix rack. The rack itself, which is shown in FIG. 9, is made up of three shelves (one per matrix column) that house the switch node cards (there are 16 such cards in every shelf) and six-shelf-processor cards (two per shelf).

Matrix Rack

Figure 10:
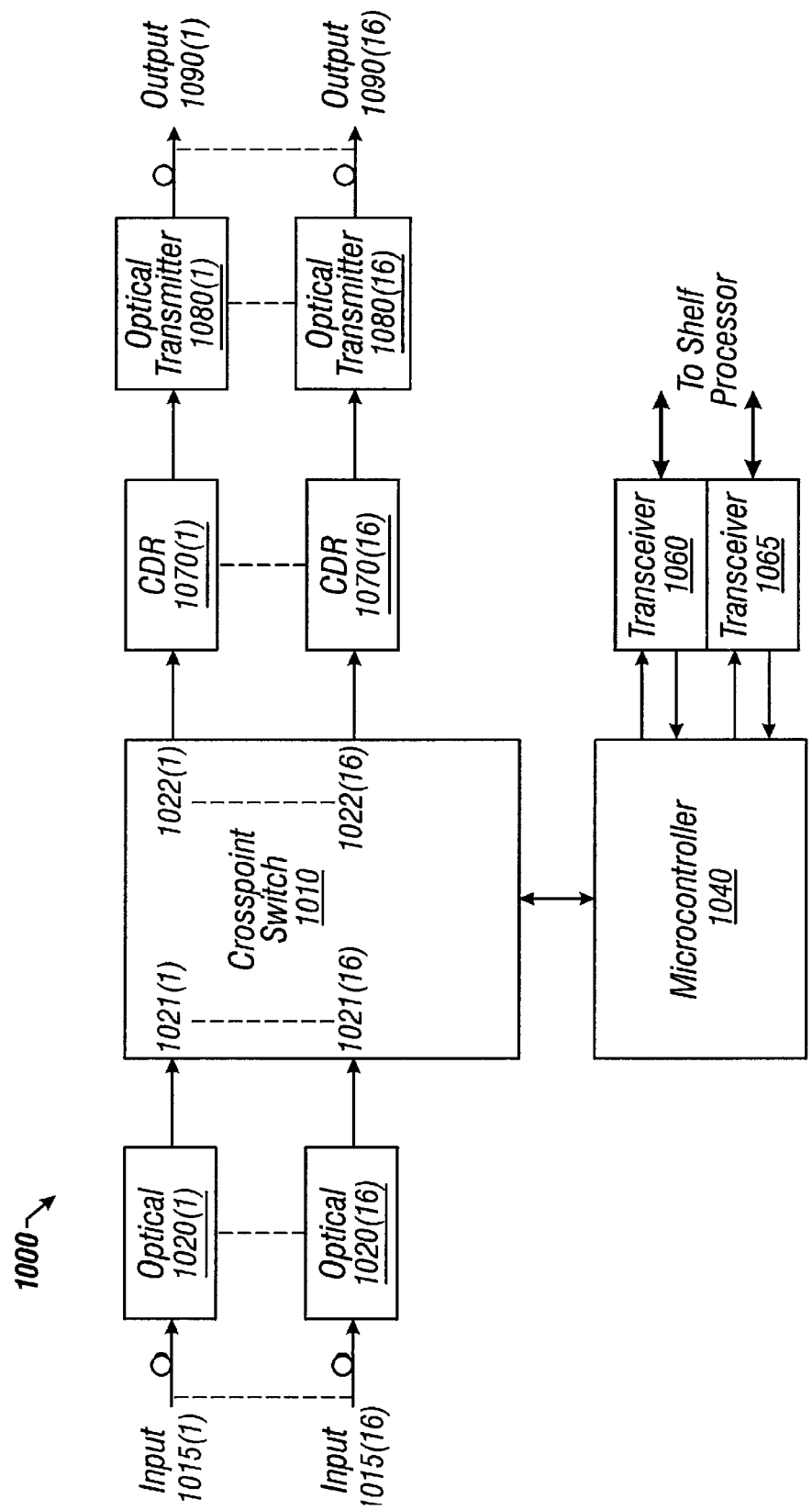
FIG. 10 illustrates one of the switching nodes.

FIG. 9, as noted, illustrates an example of a physical configuration used for holding one or more matrices, and referred to herein as a matrix rack 900. In one embodiment, matrix rack 900 is configured to hold the 48 switching nodes (i.e., switching nodes 800(1,1)–(16,3)) in a physical configuration as illustrated in FIG. 10. Switching nodes 800(1, 1)–(16,3) are configured as indicated in FIG. 10. Each of switching nodes 800(1,1)–(16,3) supports 16 input signals and 16 output signals, and thus provides switching matrix 130 with 256 input signals and 256 output signals as shown in FIG. 8, 830(1)–(256). Also shown in FIG. 9 are matrix shelf processors 910(1)–(16). Matrix shelf processors 910(1)–(6) are configured in redundant pairs to provide fault-tolerant control of switch nodes 800(1,1)–(16,3). Thus, matrix shelf processors 910(1) and 910(2) control the first "column" (i.e., switching nodes 800(1,1)–(16,1)), matrix shelf processors 910(3) and 910(4) control "column 2" (i.e., switching nodes 800(1,2)–(16,2)), and matrix shelf processors 910(9) and 910(6) control "column 3" (i.e., switching nodes 800(1,3)–(16,3)).

The cross-connect information, i.e. input-to-output mapping, is written into the crosspoint switch by a local microcontroller which receives it from the local shelf processor over a high-speed connection. The three shelf processors in each rack receive such information from the node controller, which resides in a different rack. This hierarchy can be extended indefinitely. The crosspoint switch receives a high speed serial data from the optical receivers that perform optical-to-electrical conversion on the received optical signals. Data from the crosspoint switch is re-timed to synchronize the data with the system clock of router 100, using a clock and data recovery (CDR) unit, before being converted back into an optical signal that connects to the next stage of the matrix over fiber-optic cables.

Switch Node Module

FIG. 10 illustrates one of switching nodes 800(1,1)–(16,3) as a switching node 1000. Switching node 1000, in one embodiment, is a complete, strictly non-blocking, 16×16 OC-48 multi-stage crossbar matrix which allows any of its inputs to be connected to any of its outputs regardless of the current state of the matrix. A crosspoint switch 1005 is controlled by a local microcontroller (a microcontroller 1010) that also manages the optical transceivers, CDRs, and onboard SONET device. Switch node 1000 configuration is downloaded from microcontroller 1005 over a low-speed bus.

The block diagram of switch node 1000 in FIG. 10 illustrates the main elements of a switch node using a SONET-based implementation. The core of the switch node 1000 is crosspoint switch 1005, which is a 16×16 crossbar switch when implementing a 256×256 matrix. Crosspoint switch 1005 is preferably a 2.5 Gbps 16×16 differential crosspoint switch with full broadcast capability. Any of its input signals can be connected to any, or all, of its output signals. The device is configured through a low-speed port that, through a two-step/two-stage process, allows changes to be made to switch configuration without disturbing its operation.

Assuming 16 input signals (indicated in FIG. 10 as inputs 1015(1)–(16)), crossbar switch 1010 is configured to receive optical input signals from optical receivers 1020(1)–(16) at switch input signals 1021(1)–(16). Crossbar switch 1010 also provides switch outputs 1022(1)–(16), which serve as the source of optical output signals for switch node 1000. Microcontroller 1010 is also responsible for detecting and reporting loss-of-signal (LOS) and out-of-lock (OOL) conditions from the optical receivers and CDRs, respectively. Microcontroller 1010 communicates with the shelf processor via transceivers 1060 and 1065 over a bus that carries asynchronous data over a backplane (not shown).

Incoming signals are routed to one of switch outputs 1022(1)–(16) by crosspoint switch 1005 under the control of microcontroller 1010. Switch outputs 1022(1)–(16) are coupled to CDRs 1070(1)–(16), which in turn drive optical transmitters 1080(1)–(16). Output signals from optical transmitters 1080(1)–(16) appear at outputs 1090(1)–(16) as optical signals.

Matrix Shelf Processor Module

Matrix shelf processor 1100 module provides local control and management for one of the main-matrix shelves. The matrix shelf processor 1100 communicates with the level-1 and route processors over a low speed network connection and with the matrix node cards over a multidrop, low-speed bus.

Figure 11:
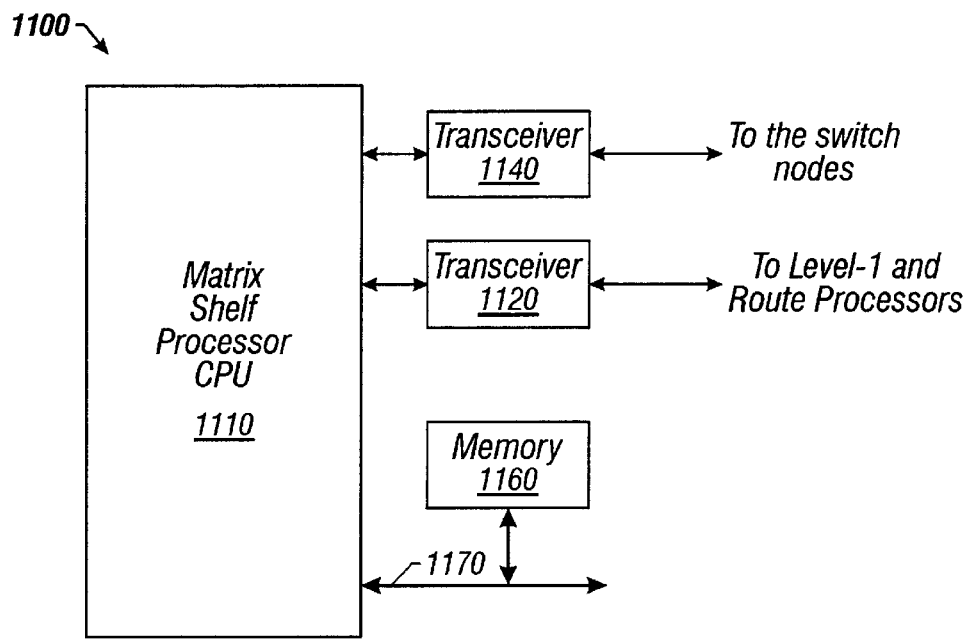
FIG. 11 illustrates a matrix shelf processor.

FIG. 11 illustrates a matrix shelf processor 1100, which is illustrative of matrix shelf processors 910(1)–(6) of FIG. 9 and shelf processor 700 of FIG. 7. Matrix shelf processor 1100 provides local control and management for one of the shelves of a main matrix such as switching matrix 130 (FIG. 1). The core of matrix shelf processor 1100 is a matrix shelf processor CPU 1110. Matrix shelf processor CPU 1110 communicates with one or more level-1 processors (not shown) and route processors (not shown) via a transceiver 1120 (preferably a 10BASE-T transceiver). Matrix shelf processor CPU 1110 communicates with the system switches (i.e., system switches 340 and 341) via a transceiver 1140. To support these functions, matrix shelf processor CPU 1110 is coupled via a processor bus 1170 to memory 1160 which provides storage for various software modules run by matrix shelf processor CPU 1110.

Management Bay

The management bay can house, for example, the following modules:

1. Level-1 processors, or system controllers, and their associated storage devices;
2. Route processors;
3. Optional group and WAN cards that provide high-speed (e.g., greater than T1) X.25 links to one or more operations systems (OS's);
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

Figure 12:
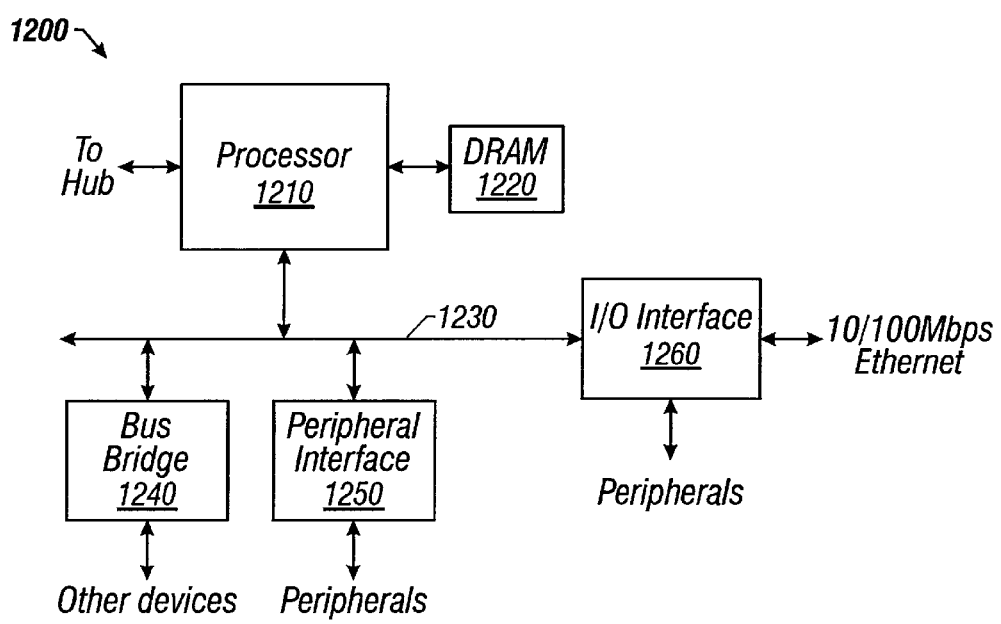
FIG. 12 illustrates a system controller.

FIG. 12 illustrates a system controller 1200 (also referred to herein as a level-1 processor). The core of the system controller 1200 is a processor 1210, which also communicates with the system switches (i.e. system switches 340 and 341). Programs run on processor 1210 are stored in memory 1220 coupled thereto. Processor 1210 is also coupled to an all-purpose bus (APB) 1230, which in turn drives several bus and communications controllers. Among the controllers interfaced to APB 1230 is a bus bridge 1240, a peripheral interface 1250, and an I/O interface 1260. I/O interface 1260 may provide functionality such as 10 Mbps/100 Mbps Ethernet communications. I/O interface 1260 also supports peripherals such as keyboards, mice, floppy drives, parallel ports, serial ports, and the like. Bus bridge 1240 allows communications between processor 1210 and other devices. Peripheral interface 1250 allows communications with peripherals such as hard disks. The level 1 processor performs various functions, such as communicating with the route processor(s) to determine how the matrix should be configured, managing the router's resources, and similar duties.

APB 1230 may also be connected to a dual-channel serial communication controller (SCC), which is used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the level-1 processor.

Route Processor Module

Figure 13:
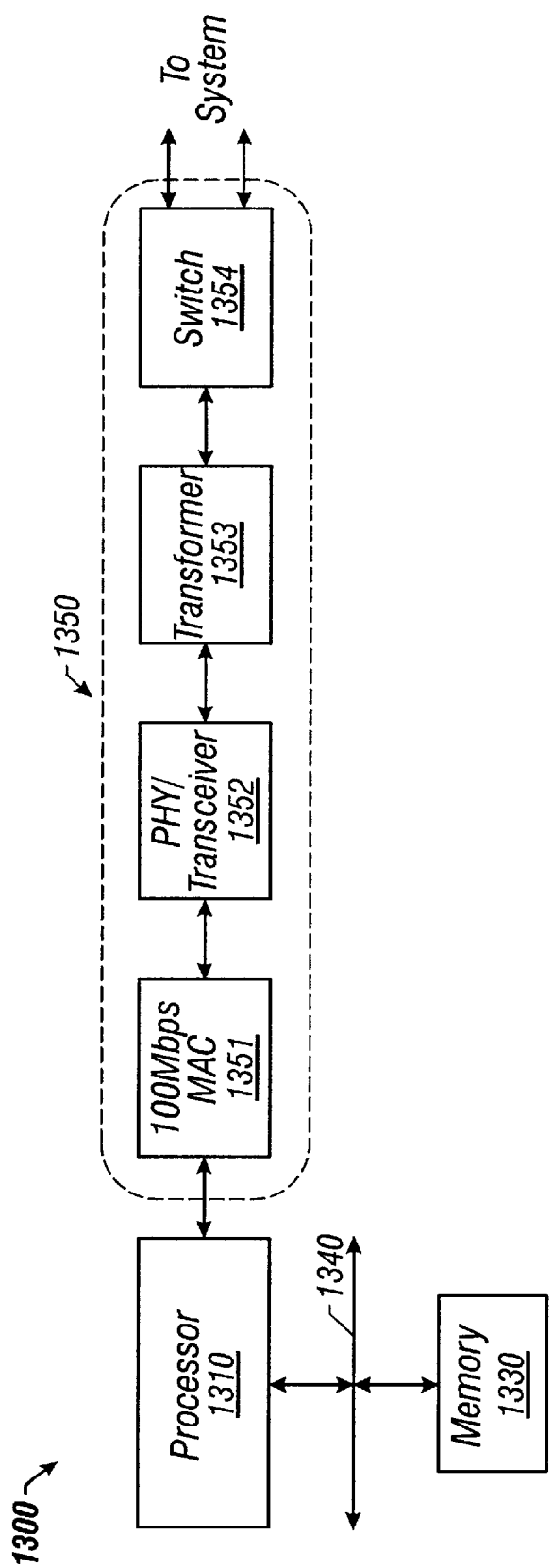
FIG. 13 illustrates a route processor.

FIG. 13 illustrates a route processor 1300. Route processor 1300 is a high-speed processor subsystem with relatively limited I/O capabilities. Route processor 1300 functions to receive link-failure indications from the line cards (not shown), computes an alternate route for failed connections using a restoration protocol such as that described in the co-pending application entitled "A METHOD FOR ROUTING INFORMATION OVER A NETWORK" and previously included by reference herein, and then sends one or more configuration requests to all affected nodes to achieve this new routing. Route processor 1300 is able to communicate directly with all system modules, including the line cards (not shown) and the matrix shelf processors (not shown) via a redundant high speed network connection to the system switch. In systems using Ethernet as the communication mechanism, route processor 1300 communicates with these elements via a redundant 100 Mbps connection to the system Ethernet switch. The core of route processor 1300 is a processor 1310 which runs software stored in memory 1330 via a CPU bus 1340. As noted, the software implements a routing protocol such as that mentioned above. Processor 1310 communicates with other systems of router 100 using an Ethernet communications mechanism via a 100 Mbps Ethernet transceiver 1350. Ethernet transceiver 1350 is depicted in FIG. 13 as including a 100 Mbps MAC 1351, a PHY/transceiver 1352, a transformer 1353 and a switch 1354. Switch 1354 provides a redundant connection to the other systems of router 100 to allow uninterrupted operation in the event of a communications failure.

System Switch

Figure 14:
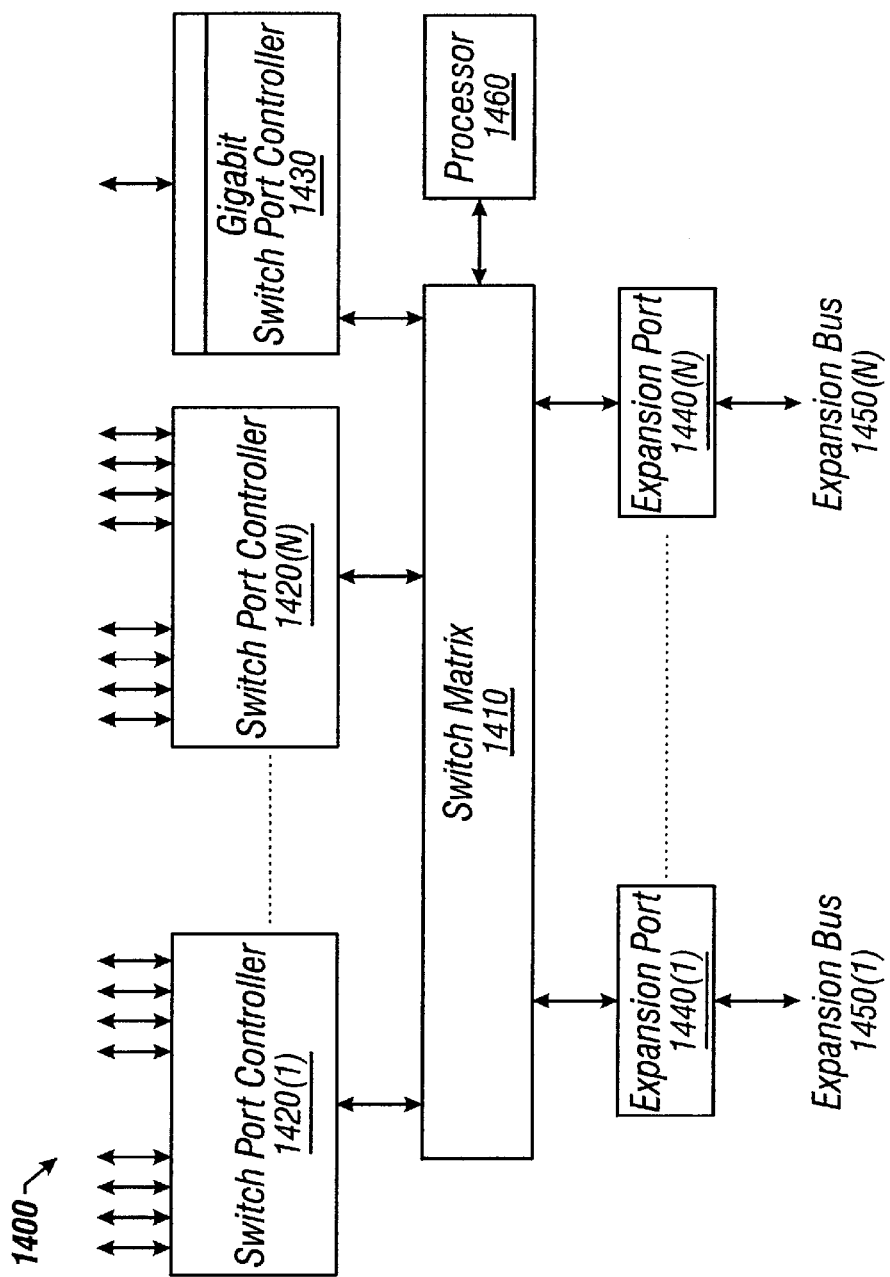
FIG. 14 illustrates an example of a system switch.

FIG. 14 illustrates an example of a system switch depicted as a system switch 1400, which can use an Ethernet-based communications, for example. In an Ethernet configuration, system switch 1400 manages the Ethernet connections from all level-1, level-2, route, and optional Wide Area Network (WAN) processors (not shown). System switch 1400 implements a high-speed, low-latency Ethernet switch that isolates local traffic to individual segments. The core of system switch 1400 is a switch matrix 1410. In one embodiment, switch matrix 1410 is an eight port bus that interconnects switch port controllers 1420(1)–(N), one or more high-speed interfaces (exemplified by a gigabit Ethernet switch port controller 1430), and expansion ports 1440(1)–(N). Each one of expansion ports 1440(1)–(N) communicates with a corresponding one of expansion buses 1450(1)–(N), respectively. Switch matrix 1410 is controlled by a processor 1460. Each copy of system Ethernet switch 1400 thus supports communications with level-1 processors, route processors, each I/O bay, and each matrix shelf processor. In Ethernet-based systems, these connections may be by 100 Mbps or 10 Mbps connections.

Software Architecture

In one embodiment, router 100 implements many functions in software to provide flexibility, support for communications protocols, and ease of implementation. The software architecture presented here forms a distributed management, control, and routing layer capable of spanning hundreds or thousands of nodes. The software architecture covers all protocol layers, management and control applications, and inter-node communication protocols and APIs.

The software modules described herein may be received by the various hardware modules of router 100, for example, from one or more computer readable media. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Overall Architecture

The software running the various processors of router 100 normally includes three major components: operating system, inter-processor and inter-node communications, and management and control applications. An important aspect of any software architecture is its underlying inter-process communications (IPC) mechanism.

IPCs that provide for the isolation of tasks are preferable. Such IPCs use message passing as their preferred communication. Message passing allows for full, but isolated interaction among tasks. To the rest of the system, a task, no matter how complex, is reduced to a simple producer and consumer of messages. It provides a set of well defined services, each accessed through one or more messages. Though sometimes visible to other tasks, in one embodiment, none of a given task's variables and structures should be accessible outside its context. Limiting task interactions to message passing and keeping runtime variables private to each task allows individual software components to evolve independently and in parallel.

In order to keep code generic (i.e., system-and processor-independent), the message-based IPC should also provide a consistent application programming interface (API) that doesn't rely on any system-specific features or attributes. The API should have the same syntax and behavior, regardless of the underlying operating system, processor, or message-passing mechanism used. With certain generating systems, for example, message queues are used to implement the IPC, while on other kernels, pipes might be more appropriate. Preferably, then, the API should provide the following services to the application code:

1. Send message;
2. Receive a message;
3. Check for available messages; and
4. Name lookup and registration.

The last service, name lookup and registration, makes it possible for communicating entities to reference one another using names rather than task ID's, which are system-dependent.

Resource Manager

A resource manager (RM) is the software module responsible for collecting information about available resources and monitoring their status during normal system operation. A resource is used generically in this document to refer to any manageable hardware element that performs one or more system functions. The RM builds its resource list from unsolicited information it receives from other modules in the system, and from periodic keep-alive messages it exchanges with those modules. The RM, for example, is the first system application notified of card failures, insertions, and removals.

In one embodiment of router 100, there are two RM versions in the system. The first, which runs on the level-1 processor, is responsible for managing system resources and, in some cases, network-wide resources. The other version, which runs on level-2 processors, is responsible for managing resources in a single shelf. This multi-level hierarchy creates a flexible and expandable system where lower-level resource managers are custom designed for the specific shelf controlled.

The RM maintains information about a given resource in a structure called the Resource Control Block (RCB). The RCB consists of two main sections: a generic section, which is the same for all resources regardless of type, and a resource-specific section that varies according to resource type. All resource managers maintain a hierarchical list of resource control blocks that represents resources under their control. The list is referred to herein as the resource list and reflects the resources' hierarchy and their interdependencies. This allows the RM to determine, relatively quickly, the effect a given resource's failure has on other members of the hierarchy.

The router 100 preferably runs one or more versions of the Unix operating system on the level-1 processor and the level-2 processors (in the I/O and matrix shelves). Level-2 processors preferably run a real-time version of the Unix operating system (OS). Other processors (e.g., level-3, route, group, and matrix-node processors) preferably run a single task that does not require the services of an operating system or kernel. While Unix operating systems are described herein as being preferable, any one of a number of operating systems may be used.

System Controller

The system controller is responsible for overall system management and control. The system controller uses a variety of protocols to communicate with other nodes in the network, including the operating system (OS). Some of the protocols satisfy specific requirements (e.g. in a SONET based system, the transfer of OAM&P message across the SONET/SDH communications channels DCC), while others implement features, or functions, that are not part of the physical protocol used. To facilitate these functions, every router in a network is assigned an ID that uniquely identifies it within the network. The ID can also serve as a priority metric that determines the node's level within the hierarchy. However, the network can be configured to allow the user to override this by manually assigning priorities to network nodes. The system controller supports a number of tasks that perform management, control, and routing functions, including resource management, OS interfacing, various network protocol servers, and operations, control, and intermediate system services.

Matrix Shelf Processor

The matrix shelf processor is responsible for the overall operation of a single main matrix shelf. It communicates with the system controller, the route processor, and the microcontroller on each of the switch nodes, to provide local control and management for the shelf, including matrix configuration, diagnostics, and error reporting. The software on the matrix shelf processor preferably runs under a real-time Unix operating system. The RM on the matrix shelf processor is responsible for managing the hardware resources in its shelf. Like other resource managers in the system, the level-2 manager on this module uses a combination of hardware and software to discover and maintain a list of available shelf resources. A protocol may be implemented to support such messaging.

In one embodiment, fault isolation is implemented by a dedicated task that is responsible for locating failures within the shelf. In a SONET based implementation, the software running on the shelf processor, with help from the microcontroller on the switch node, to determine(s) the quality of any of the input signals.

I/O Shelf Processor

Line Card Processor

The line card terminates an input signal from one of the other nodes in the network. For example, in a SONET-based implementation, a single SONET/SDH OC-48 signal is terminated by an a line card, although other signal levels (OC-192, OC-12, and so on) may be supported. In one embodiment, the software consists of two threads, one that runs in the background and is responsible for non-time critical tasks. The other thread, which runs at the interrupt level, is responsible for all real-time aspects of the software, including limited overhead processing, alarm detection and forwarding, and fault detection and recovery. The line card processor maintains a copy of its firmware and startup code onboard.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A signal router comprising:
   a signal path, wherein said signal path comprises a switching matrix and an input/output section coupled to said switching matrix,
      wherein said switching matrix comprises at least one stage and configured to:
         accept a first carrier, said first carrier carrying information,
         select a second carrier from a plurality of carriers based on routing information, said first and said second carriers differing from one another in at least one physical characteristic, and
         output said information on said second carrier, and
      wherein said input/output section comprises:
         a group matrix, coupled to said switching matrix, and
         an input/output group, coupled to said group matrix; and
   a control path, coupled to said signal path, wherein said control path comprises, a local network,
   a first processor, coupled to said local area network and configured to manage said signal path,
   a second processor, coupled to said local area network, and configured to determine said routing information and generate switch configuration information, and
   a third processor, coupled to said local area network and said switching matrix, and configured to control said switching matrix based on said switch configuration information.

2. The apparatus of claim 1, wherein said input/output group comprises a plurality of optical line cards.

3. The apparatus of claim 1, wherein said switching matrix comprises a plurality of matrix elements.

4. A signal router comprising:
   a signal path, wherein said signal path comprises a switching matrix,
      wherein said switching matrix comprises at least one stage and configured to:
         accept a first carrier, said first carrier carrying information,
         select a second carrier from a plurality of carriers based on routing information, said first and said second carriers differing from one another in at least one physical characteristic, and
         output said information on said second carrier; and
   a control path, wherein said control path comprises,
      a local area network,
      a system switch coupled to said switching matrix,
      a level-1 processor, coupled to said system switch,
      a route processor, coupled to said system switch,
      a line rack, coupled to said system switch,
      a first processor coupled to said local area network and configured to manage said signal path,
      a second processor coupled to said local area network and configured to determine said routing information and generate switch configuration information, and
      a third processor coupled to said local area network and said switching matrix and configured to control said switching matrix based on said switch configuration information.

5. The apparatus of claim 4, wherein said line rack comprises:

a shelf switch, coupled to said system switch; and a plurality of groups, coupled to said shelf switch.

6. The apparatus of claim 4, wherein each one of said plurality of groups comprises:

a first group switch, coupled to said shelf switch;

a second group switch, coupled to said shelf switch; and a plurality of line cards, coupled to said first and second group switches.

7. The apparatus of claim 4, wherein said switching matrix comprises a plurality of matrix elements.

* * * * *

UNITED STATES PATENT AND TRADEMARK OFFICE
CERTIFICATE OF CORRECTION

PATENT NO. : 6,724,757 B1
DATED : April 20, 2004
INVENTOR(S) : Haig Michael Zadikian et al.

It is certified that error appears in the above-identified patent and that said Letters Patent is hereby corrected as shown below:

<u>Column 1,</u>
Line 7, before "entitled" please delete "09/232,395" and insert -- 09/232,397 --
Line 11, after "assigned to" please delete -- Cisco Systems, Inc." and insert -- Cisco Technology, Inc. --

Signed and Sealed this

Tenth Day of August, 2004

JON W. DUDAS
*Acting Director of the United States Patent and Trademark Office*